April 14, 1970   F. K. NONNENMACHER   3,506,066
SCREW CONVEYOR
Filed Dec. 20, 1967   5 Sheets-Sheet 1
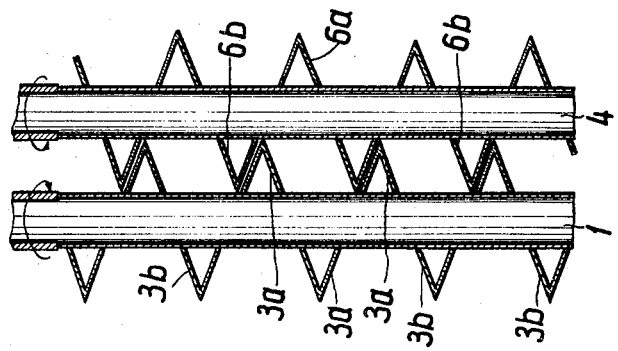
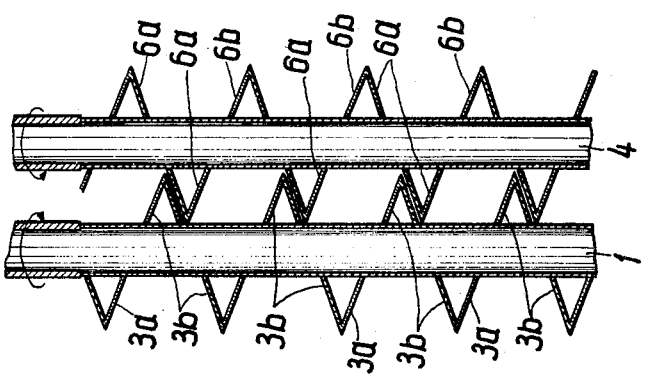
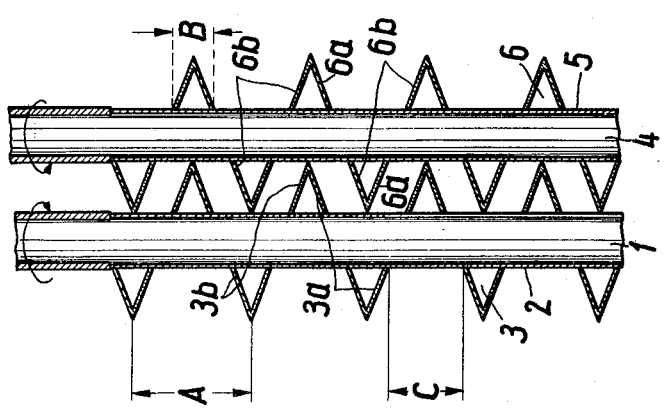
Inventor:
FRIEDRICH KARL NONNENMACHER
BY
Stephens, Huettig + O'Connell
ATTORNEYS

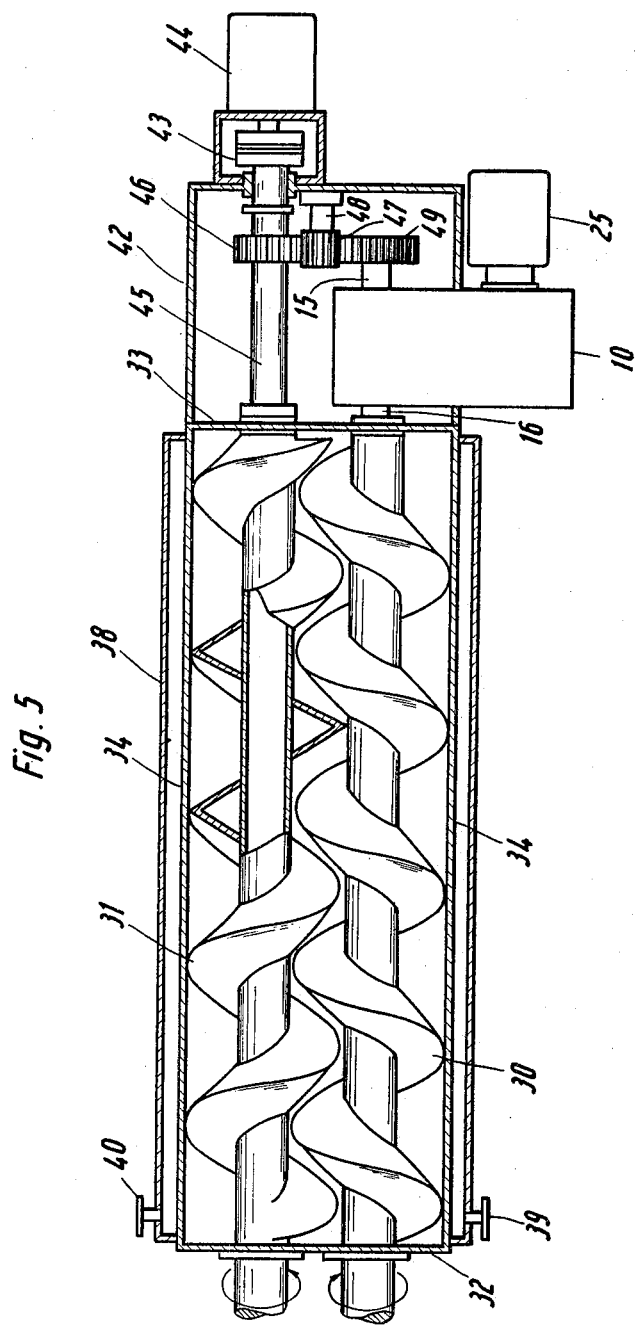

April 14, 1970     F. K. NONNENMACHER     3,506,066
SCREW CONVEYOR
Filed Dec. 20, 1967     5 Sheets-Sheet 4
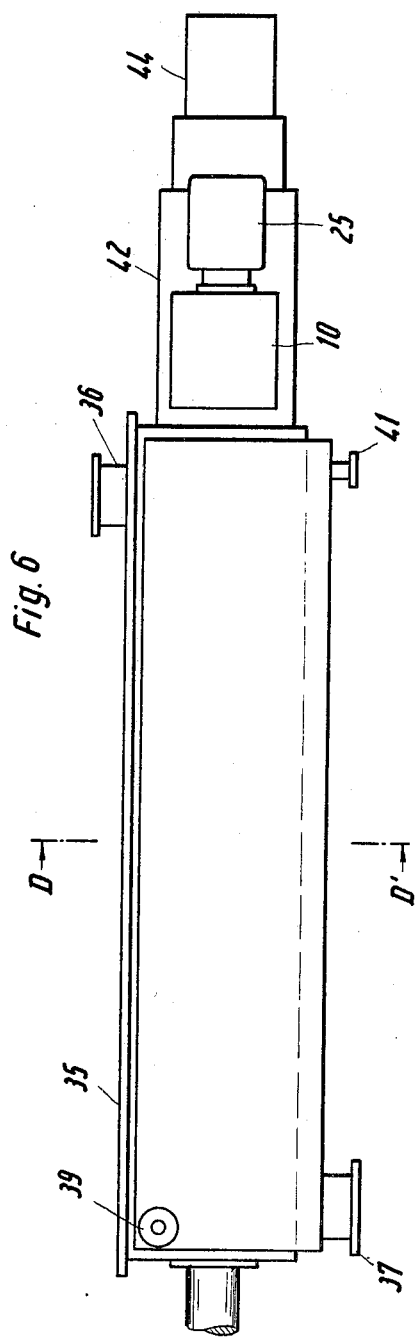
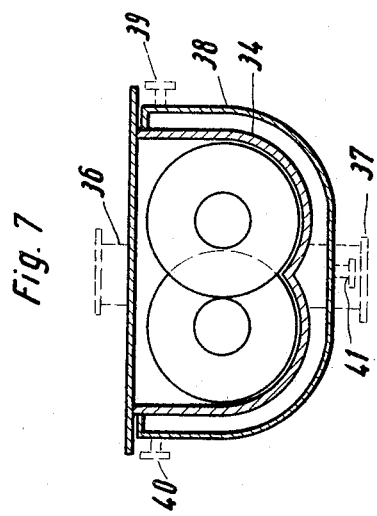
Inventor:
FRIEDRICH KARL NONNENMACHER
BY
Stephens, Huettig + O'Connell
ATTORNEYS Inventor:
FRIEDRICH KARL NONNENMACHER
BY
Stephens, Huettig + O'Connell
ATTORNEYS United States Patent Office 3,506,066
Patented Apr. 14, 1970

3,506,066
SCREW CONVEYOR
Friedrich Karl Nonnenmacher, Frankfurt am Main, Germany, assignor to Metallgesellschaft Aktiengesellschaft, Frankfurt am Main, Germany
Filed Dec. 20, 1967, Ser. No. 692,117
Claims priority, application Germany, Dec. 29, 1966, M 72,226
Int. Cl. F28f 5/06
U.S. Cl. 165—87                                                    14 Claims

ABSTRACT OF THE DISCLOSURE

One of two contrarotating parallel screws in a screw conveyor is rotatable at different speeds from the other screw. This periodically brings the screw threads of one screw into wiping and cleaning engagement with the threads of the other screw.

---

This invention relates to apparatus for subjecting liquid, conveyable semi-solid or solid substances to a mechanical or thermal treatment.

Viscous and pasty materials can be submitted to mechanically and thermal treatments in apparatus which comprises two parallel interengaging screw shafts revolving in an elonagted casing. The treated material is introduced into the apparatus at one end and the revolving screws convey it to the other end where it is discharged. The screws may be hollow for the passage therethrough of a heating or cooling fluid and the casing itself may be provided with a heating or cooling jacket.

Apparatus of this kind can be usefully employed for feeding, mixing, kneading, homogenizing, drying, heating and cooling viscous or conveyable semi-solid and solid materials. According to the configuration of the two screw shafts, two different principles of design can be distinguished, namely screw machines with self-feeding screws and screw machines with self-cleaning or self-clearing screws.

Apparatus with self-feeding screws comprise two interengaging screws of which one has a right hand and the other a left hand thread or helix. The two screws rotate in opposite directions in such manner that the sides interengage throughout their length. The material that is being conveyed through the apparatus envelope the two screws in figure-of-eight paths. In apparatus with self-feeding screws, the screws draw in the material with good effect and the mixing action is thorough. However, since the screw helices do not make contact there is no self-cleaning effect. Consequently, self-feeding screws, depending upon the nature of the material, tend to become clogged by encrusted deposits. The portions of the treated material which stick to the shafts do not participate in the mixing action and if the screws should be heated, these portions of the material overheat and become excessively dry. Adhesion of material to the shafts prevents the product from being evenly treated. If the apparatus functions as a heat exchanger, heat transfer through the layers of material which have become stuck to the screw is impeded.

In apparatus comprising self-cleaning screws, two left-hand or two right-hand screws both revolve in the same direction. The two screws are in full depth engagement and they therefore have a self-cleaning action. However, no material can pass between the two helices. The treated material is conveyed exclusively between the wall of the casing and the two helices. Consequently, the mixing and feeding effect of apparatus with self-cleaning screws is inferior. Another drawback is that the screw profiles are difficult to manufacture.

The apparatus of this invention combines the advantages of self-feeding screws with those of self-cleaning screws without their respetcive shortcomings. The present apparatus provides a good mixing action despite the fact that the formation of deposits on the screws is prevented by the action of the screws scraping each other clean. Moreover, the required screw sections are not complicated.

According to this invention, there is provided apparatus for subjecting liquid, conveyable semi-solid or solid substances to a mechanical or thermal treatment comprising a casing formed with a feed opening at one end and a product exit at the other end, two contrarotatable parallel, at least partly interengaging, screws mounted within said casing, one of said screws being a right-hand screw and the other being a left-hand screw, and means for temporarily changing the angular speed of at least one of the screws while the two screws rotate.

The means by which the objects of this invention are obtained are described more fully with reference to the accompanying drawings, in which:

FIG. 1 is a horizontal axial sectional view of the two screws of a self-feeding screw machine in a position referred to hereinafter as a center position;

FIG. 2 is a view similar to FIG. 1 showing the two screws in a position referred to hereinafter as a rear end position;

FIG. 3 is a view similar ot FIGS. 1 and 2 showing the two screws in a position referred to hereinafter as a front end position;

FIG. 5 is a sectional plan view of a screw machine provided with the gearing shown in FIG. 4, with the cover of the machine removed.

FIG. 6 is an elevation view of the apparatus shown in FIG. 5;

FIG. 7 is a section through the appartaus according to D–D' as indicated in FIG. 6;

Figure 4:
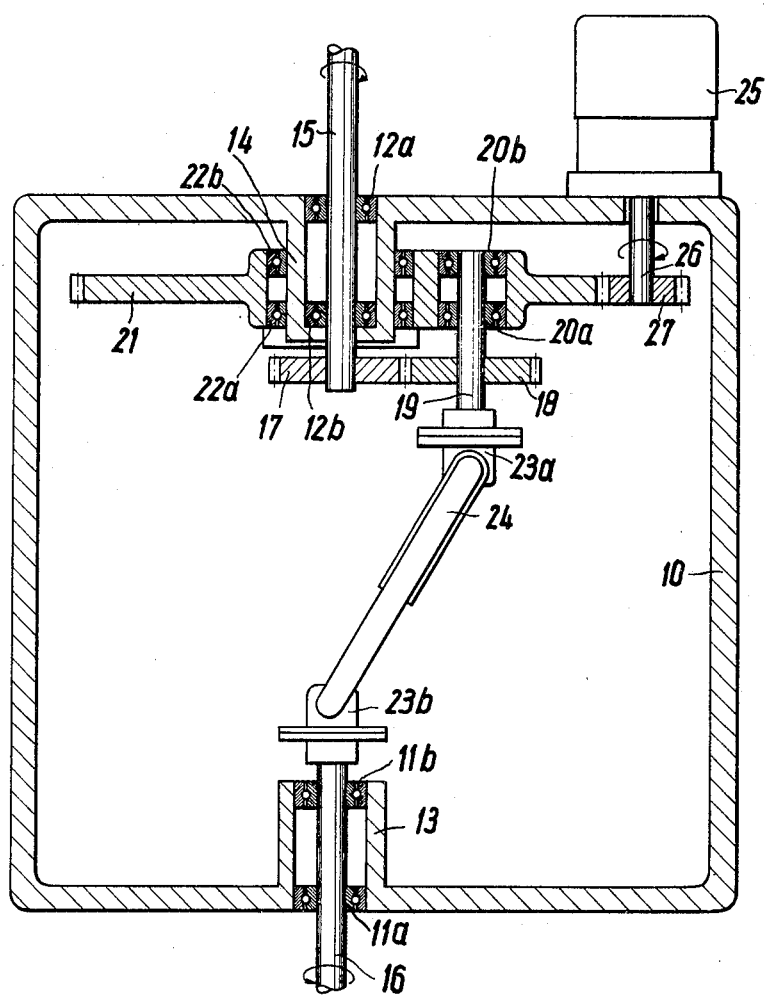
FIG. 4 is a horizontal section through the gearing for the machine shown in FIGS. 1 to 3.

As shown in FIG. 1, there is a self-feeding screw machine, having two screws 1 and 4, the casing, bearings and drive means of the machine not being shown. The left-hand screw 1 comprises a screw shaft 2 and a helix 3 affixed to the shaft, the screw 1 being a right-hand single-helix screw and revolving clockwise, as indicated in the drawing. The screw 4 on the right is a left-hand single-helix screw which revolves anticlockwise, the screw 4 likewise comprising a screw shaft 5 and a helix 6. The profile of the helices of the two mirror symmetrical screws is triangular. The distance A between the crests of consecutive convolutions exceeds the length of the base B of the triangular section helix on the shaft, so that the distance C between the roots of facing flanks of consecutive convolutions must be greater than zero. The depth of engagement of the helices 3 and 6 of the two screws is such that no clearance remains at the base. The helices 3 and 6 have two freely exposed flanks which will be hereinafter referred to as their front and rear flanks. The front flanks are marked 3a and 6a, whereas the rear flanks are marked 3b and 6b, respectively. When the hands of rotation are as shown in the drawing, the interengaging parts of the helices moving from above into the plane of the paper, the helices convey the material from the top to the bottom end of the screws in the drawing. Assuming that both screws revolve at the same constant angular speed, the position shown in longitudinal section in FIG. 1 will repeat itself at the end of each 360° revolution. The illustrated poistion will be referred to in this description as the center position, because the crest of each helix which makes contact with the shaft of the cooperating screw bisects the distance C on the latter.

However, if the angular speed or the speed of revolution of the screw 4 on the right is sufficiently retarded in relation to that of the screw 1 on the left which continues to revolve at a constant speed, then the position shown in FIG. 1 will not be re-established at the end of one revolution, and the position will change to that shown in FIG. 2. This position will be hereinafter referred to as the rear end position. If the two screws in this rear end position now revert to contrarotation at equal speeds by reacceleration of the screw 4 on the right to the angular speed of the screw 1 on the left, then the flank 6b of the helix of screw 4 will slide over the flank 3a of the helix of the cooperating screw 1. The gradual approach of the two flanks 6b and 3a will cause any material caked on the flanks 6b and 3a to be rubbed off. In order to bring the two other flanks (3b and 6a) of the helices of the screws into mutual contact, since these flanks will not clean one another in the rear end position, the angular speed of the screw 4 on the right is accelerated to exceed the angular speed of the screw 1 on the left until the two screws are in the forward end position illustrated in FIG. 3. Once this position has been reached, the speed of revolution of the screw 4 on the right is again reduced until the two screws revolve once more at the same speeds. The flanks 3b and 6a of the helices which had not been cleaned in the rear end position will now be in sliding contact. As the two flanks 3b and 6a gradually approach the front end position, each flank rubs off any deposit on the other cooperating flank.

The mutual cleaning effect of the two helix profiles is therefore generated by temporarily rotating the two screws at different angular speeds until the front or rear end position is reached. During approach into one of these end positions, one of the flanks of the helix on each screw will be cleaned because the product sticking to these flanks will be rubbed off. If the depth of interengagement of the two helices is the full height of the helices, as illustrated in FIGS. 1 to 3, then the surfaces of the shafts themselves of both screws will also be cleaned since the relative position of the crests of the helices changes from one end position to the other.

Relative changes in the angular speed or speed of revolution of one screw or of the angular speeds of both screws therefore permit the relative positions of the interengaging helices to be varied until facing flanks of the helices (3a and 6b or 3b and 6a) are in mutual contact. This occurs in the two extreme positions which are here referred to as the front and rear end positions. When the two screws revolve at the same angular speeds, the existing relative positions of their respective helices are retained. The described relative change in position of the helices does not therefore require a physical lengthwise displacement of one of the screws and the two screws can be mounted in conventional bearings.

In order to change the relative position of the helices of the two screws the angular speeds of both screws could be varied. However, as above described, it is preferred to drive one screw at constant angular speed and to increase or reduce the angular speed of the other whenever a change in the relative positions of the helices is desired. The required acceleration and deceleration in angular speed of one of the shafts can be easily produced by means of a summation of differential gearing. Such a gearing is illustratively and schematically shown in FIG. 4. The gearing is housed in a completely closed casing 10 which contains bearings 11a and 11b as well as bearings 12a and 12b in bosses 13 and 14 inside the casing 10. The bearings 12a and 12b guide a shaft 15 whereas the two bearings 11a and 11b guide a shaft 16. The shaft 15 is driven at a constant angular speed, and has a gearwheel 17 which meshes with another gearwheel 18, the two gearwheels 17 and 18 having equal numbers of teeth. The gearwheel 18 is fast on a shaft 19 which runs in bearings 20a and 20b provided in a gearwheel 21. The gearwheel 21 is mounted on bearings 22a and 22b carried on the boss 14 in the casing 10. The shaft 19 is coupled by universal joints 23a and 23b and a rod 24 to the output shaft 16. The casing 10 carries a reversible variable speed motor 25. The motor shaft 26 projects through a hole into the interior of the casing 10 where it carries a pinion 27 in mesh with the gearwheel 21.

In the operation of the gearing just described, let it first be assumed that the motor 25 has been stopped so that shaft 26 cannot turn. The input shaft 15 which is driven by a motor or through a transmission, not shown, at constant angular speed drives the shaft 19 through the gearwheels 17 and 18, the shaft 19 being coupled to the output shaft 16 by the rod 24 and the universal joints 23a and 23b. The shaft 16 will therefore revolve contrary to the input shaft 15 but at the same angular speed. If now the motor 25 is started up the gearwheel 21 will begin to rotate, driven by the pinion 27 on the motor shaft 26. The shaft 19 will therefore be rotated out of the plane of the paper and a supplementary rotary motion will be imparted thereto which either adds to or subtracts from the existing rotation of the shaft 19. When the hands of rotation are as indicated in FIG. 4, the shaft 15 revolving clockwise and the motor shaft 26 likewise clockwise, the shaft 19 and hence the shaft 16 will revolve at a higher angular speed than the shaft 15. When the shaft 15 revolves clockwise and the motor shaft 26 anticlockwise, the shaft 19 and hence the shaft 16 will revolve at an angular speed which is less than the angular speed of the shafts 15.

In the present apparatus, the screw shaft which is to be accelerated or decelerated is driven by the shaft 16. The constant speed shaft 15 may be driven through a transmission by the other screw shaft which revolves at constant speed. An arrangement of such a kind is illustratively and schematically shown in FIGS. 5 to 7. FIG. 5 is a plan view of an apparatus of this invention, with the cover of the casing removed. FIG. 6 is an elevation view of the apparatus shown in FIG. 5, and FIG. 7 is a section through the apparatus according to D–D' as indicated in FIG. 6. The two screw shafts 30 and 31 are housed in a long casing including the two head walls 32 and 33 and the side wall 34. At its bottom, the side wall 34 is shaped (see FIG. 7) to the configuration of the screws. The casing is closed on top by the cover 35. (The cover is not visible in FIG. 5.) Through the cover 35 the product inlet 36 projects into the interior of the apparatus. The product is discharged through the product exit 37 located in the bottom on the opposite end. The side wall 34 is enclosed at some distance by the jacket 38. Thus, the parts 34 and 38 form a closed double wall system for the passage therethrough of a heat exchanging medium. Inlet and outlet of the heat exchanging medium are through the nozzles 39, 40 and 41 on the jacket 38. If steam is used for heating purposes, it may be introduced for instance through the connecting nozzles 39 and 40, and the condensate formed in the double wall system between the side wall 34 and the jacket 38 is withdrawn through the nozzle 41. If a liquid heat exchanging medium is used, for example cooling water, it may be introduced through the nozzle 41 and withdrawn via the nozzles 39 and 40. The screws 30 and 31 are housed in the casing formed by the head walls 32 and 33, the side wall 34 and the cover 35. The screw 30 is a left-hand single-helical screw, the screw 31 being a right-hand single-helical screw. The gearing casing 42, which contains the summation differential gearing 10, the servo motor 25, the coupling 43 and the driving motor 44, is attached to the head wall 33. The shaft 45 of the screw 31 is driven by the motor 44 through the coupling 43 at a constant speed. The shaft 45 of the screw 31 has a gearwheel 46 which meshes via the pinion 47 on the shaft 48 with the gearwheel 49 on the shaft 15 of the summation different gearing 10. The shaft 15 therefore revolves at the same angular speed and with the same direction of rotation as the shaft 45. The input and output shafts 15 and 16 of the summation differential gearing 10, as schematically shown in FIG.

5, are contrarotating as in the case of the summation differential gearing of FIG. 4. When the servo motor 25 of the summation differential gearing in casing 10 is switched off and arrested, the helices of the two screws 30 and 31 remain in their existing relative positions during rotation, i.e. the distances between the flanks of the helix on one shaft and the facing flanks of the helix on the other shaft remain constant. However, as soon as the servo motor 25 is switched on, the flanks of the helix of one screw will approach the opposing flank of the helix on the other screw. They will do this at a rate depending upon the speed of rotation of the servo motor 25. When the helices have reached one of the ends positions the servo motor 25 is switched off and arrested. The screws 30 and 31 then continue to rotate in this end position until the servo motor is switched on again in the reverse direction of rotation. The contacting flanks of the helices will then separate until the other flanks of the helices make contact in the other end position. Viewed from the driven end, the screw 30 revolves clockwise, whereas the other screw 31 revolves anticlockwise. The direction of motion of the screws on the interengaging side is therefore from above into the plane of the paper. For shafts rotating in these directions, the feed is introduced at the right-hand end of the apparatus through the charging opening 36 whence the feed is conveyed through the apparatus from right to left and discharged through the product exit 37 in the bottom on the left-hand end. As is conventional, the screws may be hollow for the passage therethrough of a heat exchanging medium as shown in FIG. 5 for the screw 31, part of which is shown in a horizontal cutout view. The heat exchanging medium may be admitted through the hollow screw shaft and discharges from the hollow helix or conversely.

Figure 10:
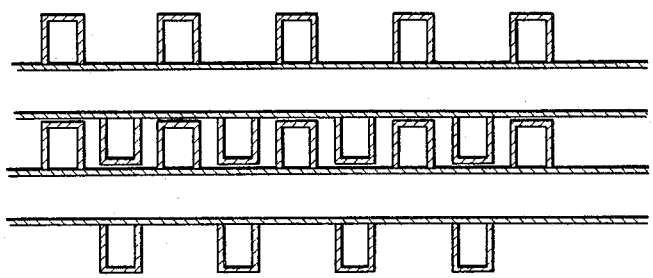
Figure 9:
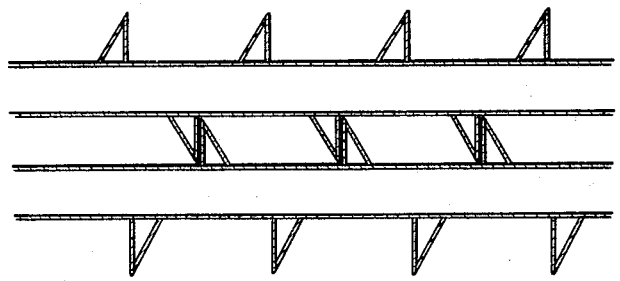
Figure 8:
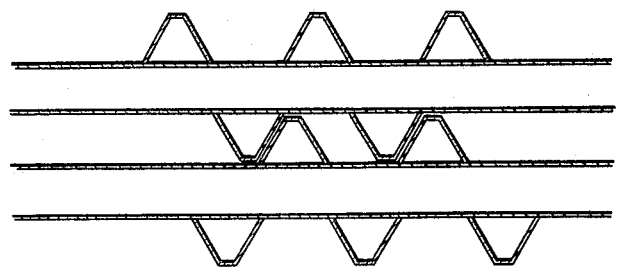

The helices may have cross-sections other than triangular, such as rectangular, trapezoidal or sawtooth sections. FIGS. 8 to 10 are horizontal views showing schematically two screw shafts each. The helices of the two screw shafts shown in FIG. 8 have trapezoidal cross-sections. The helices of the screw shafts shown in FIG. 9 have sawtooth sections. The screw shafts of the FIGS. 8 and 9 are shown in two end positions. The two screws of FIG. 10 are shown in the center position. The helices of these screws shafts have rectangular sections. Facing flanks of the helices on the screws must be spaced a finite distance apart when the screws are in the center position since otherwise their relative positions could not be changed. Helices which have an equilateral or isosceles triangular cross-section may often be convenient, such cross-sections being easy to produce.

Full depth engagement of the helices of the screws is an advantage because this ensures that the shafts themselves will also be scraped clean when the relative position of the helices on the two screws changes.

If the helices on the screw shafts are transferred from one end position to the other very quickly by an high driving speed of the servo motor 25, then the material between the helices will be submitted to a supplementary kneading and squeezing action. This may be sometimes desirable. The helix positions of the screw shafts are then made rapidly to oscillate between the two end positions. In other cases, the properties of the treated material may make it desirable to avoid the generation of squeezing effects. The two screws are then preferably made to revolve with their helices in relative central position and the speed of rotation of one screw is only slightly varied to bring the helix of this screw slowly into an end position for the purpose of cleaning.

In yet other cases, it may be useful to retard the speed at which the helices approach an end position as soon as the layers of feed which adhere to the approaching helix flanks move into contact. This method of control permits the deposits that have collected on the flanks of the helices on the shafts to be ground away slowly rather than to be broken away in large flakes.

The above-described different methods of operation of the present apparatus can be easily performed with the aid of the summation differential gearing by starting and stopping the servo motor or by varying its speed, possibly under fully automatic control.

Figure 11:
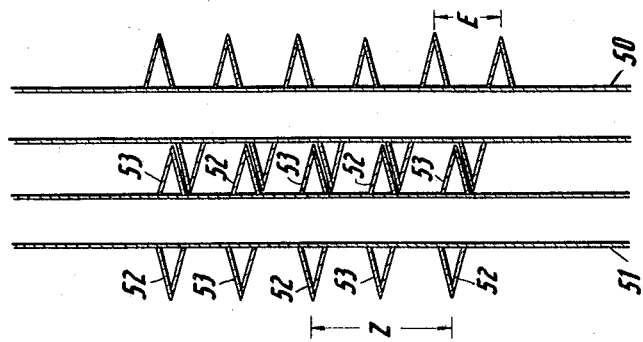
FIGS. 8 to 11 are horizontal views showing schematically two screw shafts each.

Contrarotating screw shafts carrying two or more helices of different pitch may also be combined. For instance, a right-hand twin-helical screw could be combined with a left-hand twin-helical screw as shown schematically for instance in FIG. 11 in a horizontal view. As in the case of FIGS. 1 to 3 and 8 to 10, the bearings, the drive etc. are not shown. The right screw 50 is a right-hand single-helical screw. The pitch of this single-helical screw is designated by letter E. The left screw 51 is a left-hand twin-helical screw. The pitches of the two helices are designated as Z. The dimensions E and Z are so selected that equation $2E = Z$ is satisfied. In the horizontal view of FIG. 11 the visible parts of the helix of the screw 51 are designated by 52, and the visible parts of the second helix are designated by 53. All helices shown in FIG. 11 have triangular cross-sections. Particularly good self-cleaning effects can be achieved in the present apparatus by combining rotating screws carrying multiple helices that differ in number, such as a left-hand single helical screw and a right-hand double helical screw. Alternatively, a right-hand double helical screw could be combined with a left-hand triple or quadruple helical screw. By combining screw shafts provided with multiple helical screws in different numbers, the flanks of the helices are subjected to a particularly effective cleaning action because flanks which in end positions are in linear contact are never in rolling contact at any point.

The helices of screws having like numbers of helices in the present apparatus do not vary their relative positions when they revolve at equal speeds, as has been explained. However, if two screws Q and P having different numbers of helices are combined in the apparatus and $q$ is the number of helices on screw Q whereas $p$ is the number of helices on the other screw P, and if $W_q$ is the angular speed of screw Q and $W_p$ the angular speed of screw P, then the relative position of the helices on the two screws will not change if the angular speeds of the two screws are related by the following formula $$W_p/W_q = q/p$$

The respective r.p.m. $n_p$ and $n_q$ of the two screws P and Q will then be $$\frac{n_p}{n_q} = \frac{W_p}{W_q} = \frac{q}{p}$$

i.e., when the r.p.m.'s or angular speeds of the screws are inversely proportional to the number of helices on each screw the relative position of the helices will not vary when the screws revolve. If the speed of revolution of one of the screws is varied, i.e., if $$\frac{n_p}{n_q} = \frac{W_p}{W_q} \neq \frac{q}{p}$$

then the helices will change their relative positions and the flanks of the helices will move closer together into the front or rear end position. As soon as the two flanks in question make contact, the speeds of the screws are restored to angular speeds conforming with the proportion.

$$W_q/W_p = p/q$$

when no further relative positional change will occur.

What is claimed is:

1. Apparatus for subjecting liquid, conveyable semi-solid or solid substances to a mechanical or thermal treatment, comprising a casing formed with a feed opening at one end and a product exit at the other end, two contrarotatable parallel and at least partly interengaging conveyors screws mounted within said casing, one of said screws being a right-hand screw and the other being a left-hand screw, the distance (A) between the crests of consecutive convolutions in each screw exceeding the length of the base (B) on the shaft for forming a space (C) on the shaft between the convolutions, drive means for rotating said screws, and means for temporarily changing the angular speed of at least one of the screws while the two screws are rotating to bring opposite pairs of the facing flanks of the blade helices into selective wiping and cleaning engagement.

2. Apparatus as in claim 1, said means for changing the speed being such that the ratio of the angular speed $W_q$ of one screw Q carrying $q$ helices to the angular speed $W_p$ of the other screw P carrying $p$ helices is controllable at times according to $$W_q/W_p = p/q$$

and at other times according to $$W_q/W_p \neq p/q$$

3. Apparatus as in claim 1, said means for changing the speed being such that the screws revolve at angular speeds at which the proportion $W_q/W_p$ differs from the proportion $p/q$ until facing flanks of the respective helices cake contact, and that the two screws then continue to rotate at angular speeds at which the ratio $W_q/W_p$ is equal to $p/q$.

4. Apparatus as in claim 3, one screw being continuously rotated at a constant angular speed by said drive means.

5. Apparatus as in claim 4, said speed changing means comprising a summation differential gearing connecting said drive means to said screw through which the other screw which is not continuously driven at constant angular speed is temporarily driven at higher or lower angular speeds.

6. Apparatus as in claim 5, the main drive of the summation differential gearing being driven from the screw shaft which is driven at constant angular speed.

7. Apparatus as in claim 1, the helix sections of the screws being triangular.

8. Apparatus as in claim 1, the helix sections on the screws being rectangular.

9. Apparatus as in claim 1, the helix sections on the screws being sawtooth or trapezium-shaped.

10. Apparatus as in claim 1, further comprising hollow screw shafts and helices for conducting a heat exchanging fluid.

11. Apparatus as in claim 1, further comprising jacket means on said casing for the passage therethrough of a heat exchanging fluid.

12. Apparatus as in claim 1, said screws being interengaged to the full depth of their helices.

13. Apparatus as in claim 1, both of said screws being single helical screws.

14. Apparatus as in claim 1, said screws being multi-helical and having different numbers of helices.

References Cited

UNITED STATES PATENTS 2,890,865    6/1959    Costa et al. _____ 165—92
3,255,814    6/1966    Zimmerman et al. _____ 165—87

FOREIGN PATENTS 1,029,295    5/1966    Great Britain.

LLOYD L. KING, Primary Examiner

T. W. STREULE, Assistant Examiner

U.S. Cl. X.R.

259—6